Dec. 16, 1941.   E. C. HORTON   2,266,394
WINDSHIELD WIPER AND METHOD OF FORMING THE SAME
Filed July 13, 1939
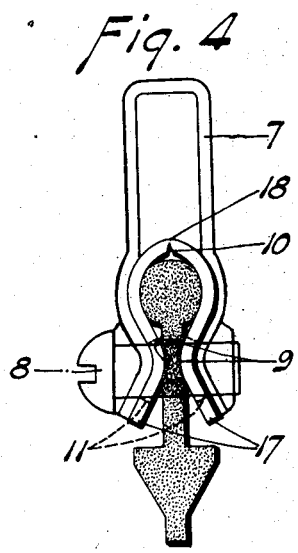
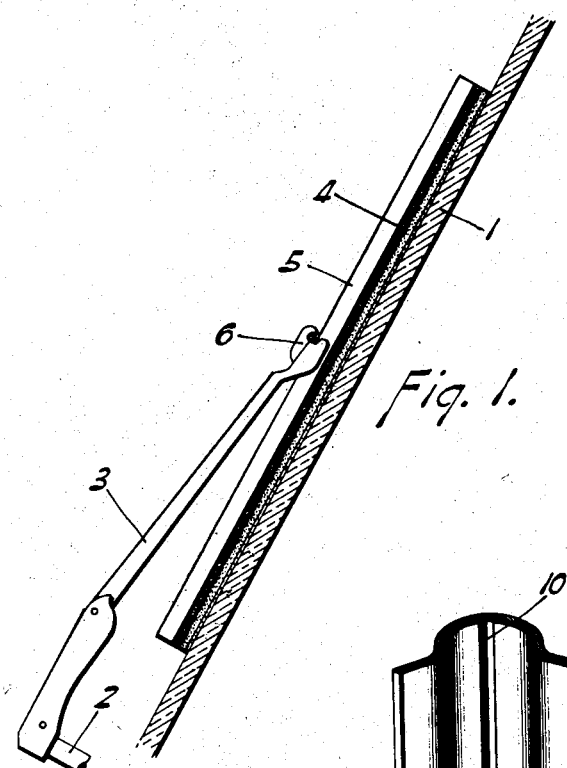
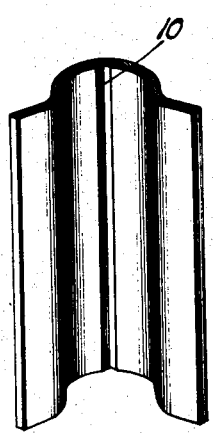
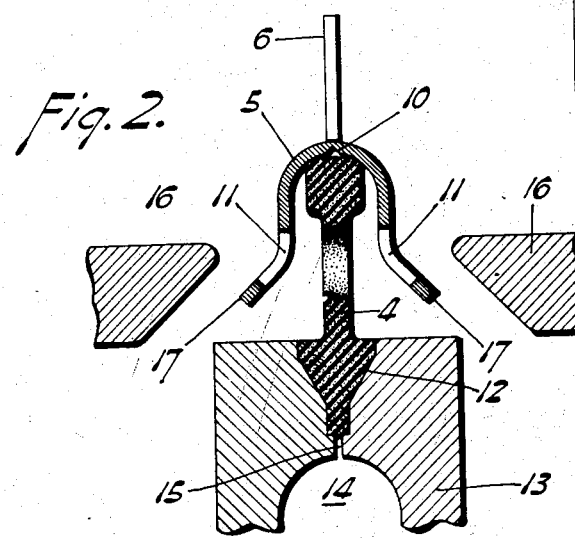
INVENTOR
Erwin C. Horton
BY
Beau, Brooks, Buckley & Beau.
ATTORNEYS Patented Dec. 16, 1941

2,266,394

UNITED STATES PATENT OFFICE 2,266,394

WINDSHIELD WIPER AND METHOD OF FORMING THE SAME

Erwin C. Horton, Hamburg, N. Y., assignor to Trico Products Corporation, Buffalo, N. Y.

Application July 13, 1939, Serial No. 284,295

5 Claims. (Cl. 15—245)

This invention relates to a window or windshield wiper and a method of forming the same.

The windshield cleaning squeegee with which motor vehicles are now equipped, comprises a wiping strip or body with a channeled reinforcement folded over the back edge thereof in clamping embrace. Some difficulty has heretofore been experienced in applying the channeled reinforcement to the wiper strip by reason of an improper folding of the channeled member which resulted in a distorted clamping embrace on the wiping body and a consequential chattering of the wiper on the windshield surface. Such deformation of the wiper consequently caused a blurred field of vision which was quite annoying to the motorist. The primary object of the present invention is to insure an accurate positioning of the reinforcement and therefore a proper formation of the wiper for compelling the utmost wiping efficiency in the practical use of the same. More particularly the invention involves the localization of an area which will delineate an accurately positioned line of fold about which the sides of the holder will be disposed in true opposition when brought into clamping embrace with the interposed wiper body.

In the drawing showing the preferred embodiment of the present invention,

Fig. 1 is a fragmentary side elevation of the wiping member mounted in operative position on the windshield of a motor vehicle;

Fig. 2 is a fragmentary view showing the holder about to be clamped on to the wiping body;

Fig. 3 is a fragmentary perspective view of the channeled holder preliminary to placing it over the back of the wiping strip; and Fig. 4 is an end elevation of the completed wiper depicting a modified form of mounting clip.

Referring more particularly to the drawing, the numeral 1 designates the windshield or window of a motor vehicle, 2 the operating shaft of a windshield cleaner, and 3 the wiper carrying arm which is fixed at its inner end to the shaft 2 for oscillation thereby and adapted at its outer end to operatively engage the wiper. As shown, the wiper comprises a flexible wiping body 4 of rubber or some other suitable wiping material, and preferably of strip form over the back of which is placed the reinforcing metal holder 5 of channel formation. For attaching the wiper or blade to the arm 3, there is provided on the holder an attaching fin 6 designed to interengage in a slot in the wiper arm, or for other types of wiper arms the fin may be replaced by a clip 7 of inverted U-shape placed over the back of the holder and secured thereto by a suitable fastener 8. This clip is frequently sold as an attachment for the blade unit depicted in Fig. 1 so as to render the unit universally attachable to the different types of arms found on motor vehicles and for this purpose the blade is provided immediately beneath the fin 6 with an opening 11 to receive the screw 8, the fin being so constructed as to permit displacement thereof prior to mounting the clip 7, where such is necessary.

In prior practices the partially formed channeled holder was placed over the back of the rubber strip and then drawn into clamping embrace with the opposite sides of the strip, as shown at 9 in Fig. 4. Through improper placement of the partially folded holder over the back of the rubber strip at the time the clamping pressure was applied the embracing portions of the holder sides would sometimes become relatively offset, which in turn would permit the rubber wiping edge a greater freedom of flexing in one direction than in the opposite direction and result in the wiper chattering on the glass on every other stroke. This would also sometimes cause a displacement of the attaching fin or clip and produce a binding interlock with the arm when attached thereto so that the wiper would be free to assume a dragging position at the beginning of one stroke but prevented from assuming a like position at the beginning of the next succeeding stroke.

To overcome this disadvantage and to insure the greatest efficiency from the wiper is the main desideratum of the present invention and according to the illustrated embodiment this is accomplished by providing a weakened zone midway of the holder blank to delineate or demarcate a line of fold about which the holder is shaped as it is clampingly embraced with the wiping strip. This weakened area is formed by providing a groove 10 extending midway of the holder blank and more or less coextensive therewith. Simultaneously therewith the blank may be formed with the openings 11 for receiving the fastener 8. This preliminary formation may be expeditiously accomplished in a manner set forth in my copending application Serial No. 252,971, filed January 26, 1939, and produce an open channel formation substantially as shown in Figs. 2 and 3 so that the channel may be placed in an inverted position over the back of the wiping body 4, while the latter is supported in a seat 12 of a pneumatic clamp 13 which has a suction chamber 14 communicating by a slit 15 with said seat.

With the parts so arranged as depicted in Fig. 2, the jaws 16 are brought against the sides of the holder 5 to bend them against the sides of the wiping strip with a clamping pressure and thereby complete the formation of the blade which is shown more fully in the end elevation of Fig. 4. As the jaws 16 complete this final shaping of the holder, the bending of the channeled sides will occur from the weakened area as provided by the groove 10 and consequently the two sides of the channel will be brought into accurate registry for clamping against the wiper strip. The wiping edge of the strip will therefore oscillate freely from the line of clamping in either direction, the extent of oscillation being determined by the outward flaring of the channel margins 17 resulting from a preliminary shaping of the channel.

It will therefore be seen that this definitely located weakened zone will insure the accurate completion of the blade, both with respect to the relation of the opposed clamping areas 9 or bends when the margins 17 are flared, as well as the arm attaching means 6, 7, and this will insure a proper non-chattering performance of the wiper on the windshield as the arm 3 is moved back and forth. The arm attaching clip 6 is secured in the line of fold by passing its base through a slot over the aperture in the holder blank and there swaging the same or otherwise interlocking the two parts together in an approved manner. As above stated, the groove or score line 10 may extend the full length of the blank or it may be terminated short of the clip 6 so as not to detract from a firm anchorage of the latter. This will not detract from a proper registry when folding or closing the open channel against the sides of the wiping strip. By reason of the weakened area the back of the holder will be given a sharper bend forming in effect a ridge as indicated at 18 to facilitate the rocking of the blade on the flat undersurface of the arm terminal. It also facilitates a reopening of the channel to replace the wiping body when desired.

It will be understood that the construction described and shown herein is merely illustrative of the inventive principles involved which may be applied to other physical embodiments without departing from the scope and spirit of the invention claimed.

What is claimed is:

1. The method of forming a wiper blade wherein a channeled metal holder is secured over the back of a flexible wiping strip for reinforcement, consisting in preliminarily forming the holder blank with a channel formation and providing a midway weakened zone for delineating a longitudinal line of fold in the bottom of the channel, mounting an arm attaching means on the back of the holder at such line of fold, then placing the channeled holder over a longitudinal edge of the wiping strip, and closing the sides of the channel against the sides of the strip about the line of fold.

2. A squeegee comprising a wiping body and a channeled backing holder including side walls clampingly embracing the back portion of said body, said channeled holder being formed with a narrow medial zone of relatively weakened material extending centrally and longitudinally at a line of fold for the walls, the longitudinally extending side walls being so relatively shaped and spaced that the wiper is engaged with uniform pressure at directly opposing points.

3. A squeegee comprising a wiping body and a channeled backing holder, said holder including a central portion and side wall portions, the side wall portions clampingly embracing the back portion of said body, and the central portion of the holder being formed with a narrow zone of relatively weakened material extending longitudinally at a line of fold of the side walls, the side walls being relatively so shaped and spaced that the wiper is engaged with uniform pressure at directly opposing points.

4. A squeegee comprising a wiping body having a channeled backing including side walls and a central portion on which a wiper arm presses to urge the wiping body against the surface being wiped, the bottom of the central portion of said channel being formed substantially throughout its length with a relatively narrow area of reduced thickness along which the sides of the channel are folded, and a ridge extending along the outer surface of said channel formed of protruding portions of the reduced area urged outwardly by the folding of said side walls.

5. A squeegee comprising a wiping body and a channeled backing holder including side walls clampingly embracing the back portion of the body, and an attaching fin fixed centrally to the outer face of said holder, said holder being materially reduced in thickness at each side of said fin in a direction and area defining a line of fold, whereby the side wall portions of said channel embracing said body are located at predetermined opposed points, the side walls being so shaped and arranged that the wiper is engaged with uniform pressure at opposed areas.

ERWIN C. HORTON.